Sept. 26, 1967  S. A. UNSWORTH  3,344,272
HEAT CONDUCTING DEVICE FOR DETECTING HOT JOURNAL BOXES
Filed Oct. 7, 1965  2 Sheets-Sheet 1

Samuel A. Unsworth
INVENTOR.

BY *Clarence A. O'Brien*
*and Harvey B. Jacobson*
Attorneys

Sept. 26, 1967  S. A. UNSWORTH  3,344,272
HEAT CONDUCTING DEVICE FOR DETECTING HOT JOURNAL BOXES
Filed Oct. 7, 1965  2 Sheets-Sheet 2
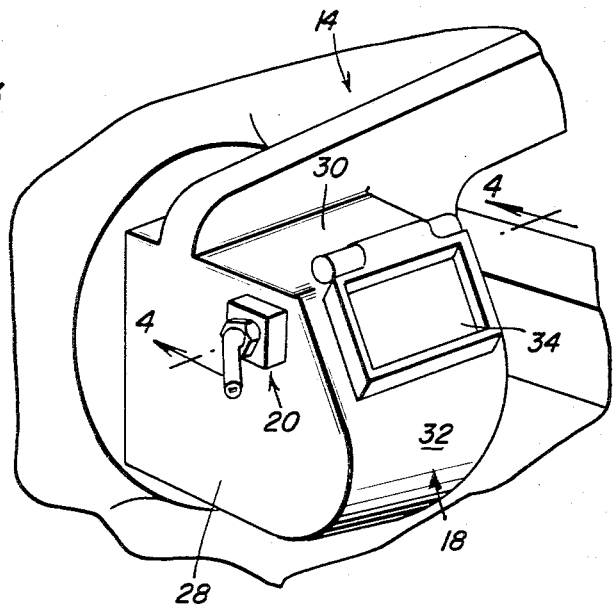
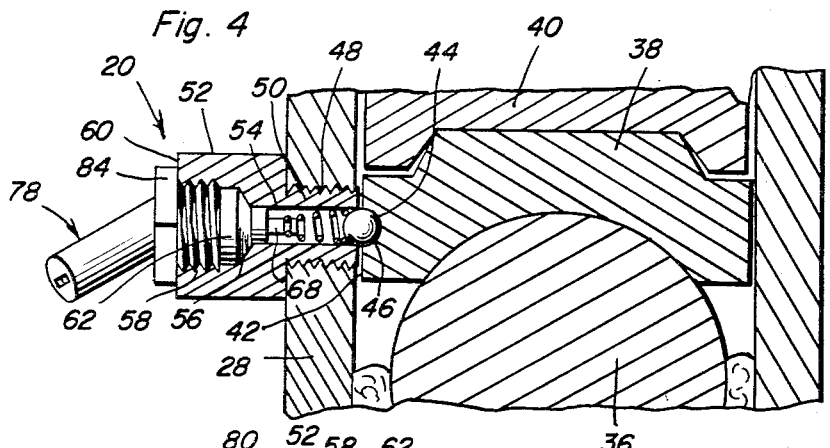
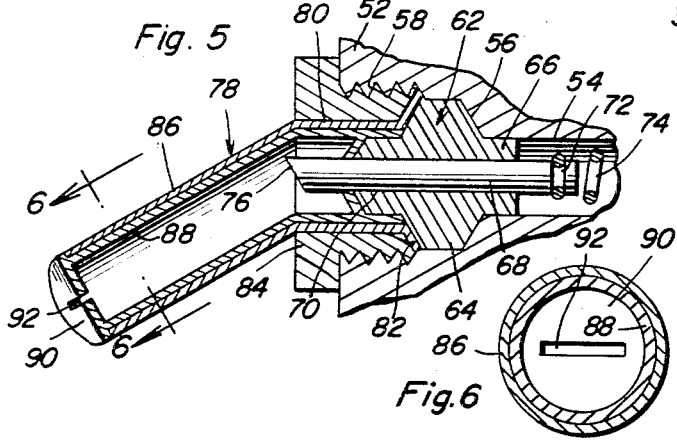
Samuel A. Unsworth
INVENTOR.

United States Patent Office 3,344,272
Patented Sept. 26, 1967

3,344,272
HEAT CONDUCTING DEVICE FOR DETECTING HOT JOURNAL BOXES
Samuel A. Unsworth, 206 Union St., Cumberland, Md. 21502
Filed Oct. 7, 1965, Ser. No. 493,735
4 Claims. (Cl. 246—169)

This invention relates to the monitoring of journal boxes associated with railroad cars and more particularly to improved apparatus for detecting any overheating condition of journal boxes on railroad cars.

The use of infrared radiation detectors for monitoring the condition of railroad journal boxes is well known. However, the ability of such detectors to provide a warning of a defective journal box within sufficient time to prevent damage or derailment of a railroad car is sometimes less than satisfactory because of several varying factors which influence the amount of radiant energy emitted from the journal box and picked up by the detector.

It is well known, that there is a substantial temperature difference between the outside surface of a railroad journal box and the internal parts thereof because of a relatively high thermal impedance between the outside surface of the journal box and the interior thereof. Because of this temperature difference and the mass of the material through which the thermal path is ordinarily established between the interior and the external surface from which radiation is radiated toward the detector, the outside temperature of the journal box will be a function of time when the journal box is in the process of overheating. Accordingly, if there is any severe defect in the journal box, the defect may not be detected by the detector within sufficient time to avoid damage as aforementioned. Further, the radiation emitted from the outside of the journal box will also be affected by the ambient temperature to adversely affect the ability of the detector to properly monitor the conditions of the journal boxes passing thereby. Still further, the amount of radiant energy received by the detector may vary in accordance with changes in the emissivity of the usual radiating surface of the journal boxes. The emissivity of the radiating surface such as the trailing vertical sides of the journal box housings may be affected by the coating thereof with paint or deposit of dust thereon.

It is therefore a primary object of the present invention to provide facilities for enhancing the ability of the usual infrared radiation detector to properly monitor the conditions of railroad journal boxes, by eliminating or reducing the aforementioned factors which tend to misleadingly vary the amount of radiant energy emitted from the journal box.

An additional object of the present invention is to provide apparatus associated with a railroad journal box and an infrared radiation detector for monitoring the heating condition of the journal box, in order to reduce the temperature drop which normally occurs between the internal bearing member or brass of the journal box and the external surface from which radiation is emitted. This is accomplished by establishing a relatively uniform and less massive thermal path of low impedance between the interior of the journal box and the external surface from which radiation is emitted. As a result of the foregoing, a substantial reduction in time is achieved within which steady state, equilibrium conditions are attained when any temperature change in the interior of the journal box occurs. The infrared radiation detector may thereby be rendered effective to warn of a dangerous yet transient condition within the journal box.

A further object of the present invention is to provide facilities for radiating radiant energy from a railroad journal box in such a manner as to prevent changes in the emissivity of the emissive surface and to reduce the effect thereon of changes in ambient temperature.

A still further object of the present invention is to provide improved facilities for radiating radiant energy from a railroad journal box to a monitoring detector whereby greater flexibility in the placement of the detector is made possible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a perspective view of an installed railroad journal box mounting the heat-conducting device associated with the present invention.

FIGURE 4 is a partial sectional view taken substantially through a plane indicated by section line 4—4 in FIGURE 3.

FIGURE 5 is an enlarged partial sectional view of a portion of the heat-conducting device shown in FIGURES 3 and 4.

FIGURE 6 is a transverse sectional view taken substantially through a plane indicated by section line 6—6 in FIGURE 5.

Figure 1:
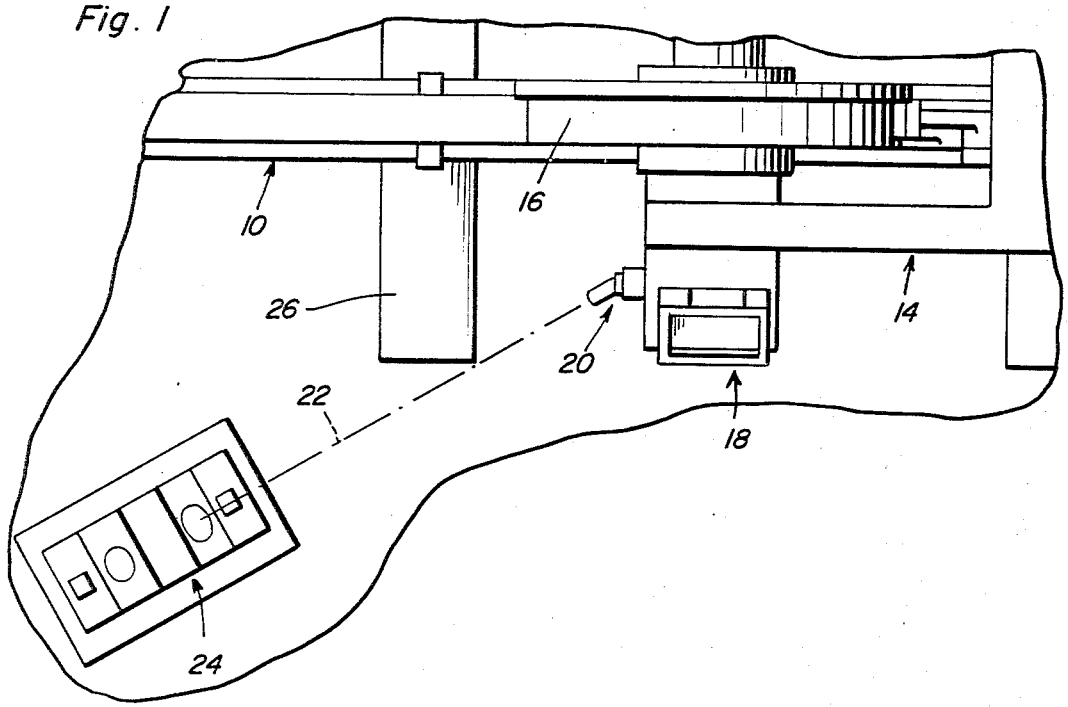
FIGURE 1 is a top plan view of a railroad journal box monitoring arrangement in accordance with the present invention.
Figure 2:
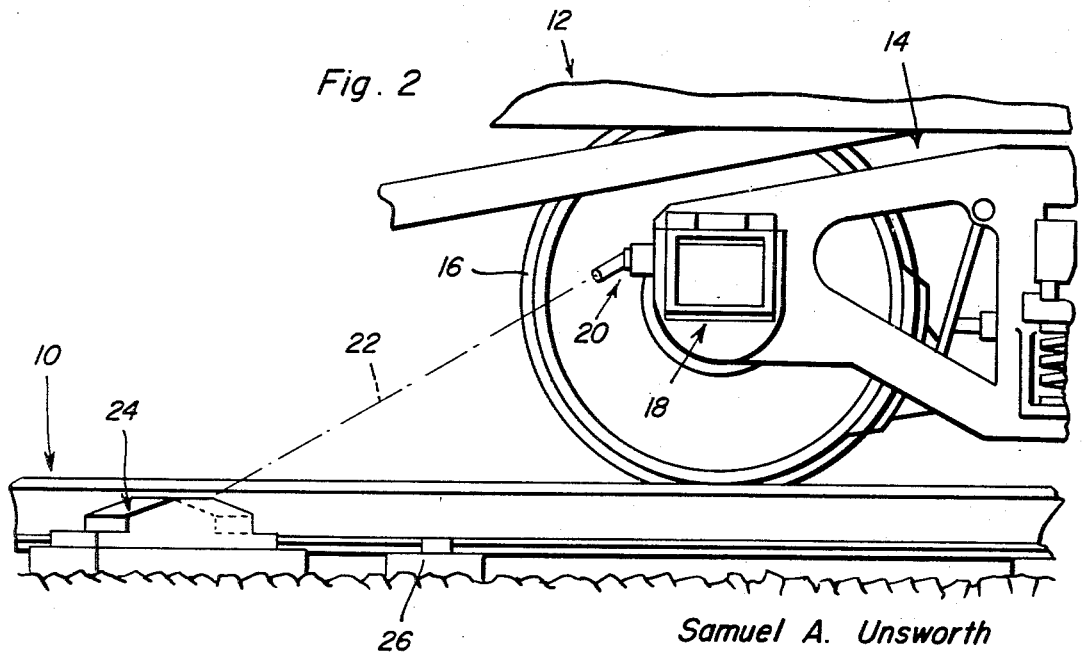
FIGURE 2 is a side elevational view of the arrangement shown in FIGURE 1.

Referring now to the drawings in detail, FIGURES 1 and 2 show a railroad track generally referred to by reference numeral 10 on which a railroad car 12 is mounted by means of truck assemblies 14 which rotatably journal the wheels 16. As usual, each truck mounts at the wheel-journaling end portions thereof, a journal box generally referred to by reference numeral 18. In accordance with the present invention, the journal box has installed thereon a heat-conducting device generally referred to by reference numeral 20 so that a beam of infrared radiation 22 generated by heat may be directed from the journal box to an infrared radiation detector generally referred to by reference numeral 24. The detector may be mounted at any suitable location as for example at an angle to and laterally spaced from the railroad track 10 as shown in FIGURES 1 and 2. Radiation detectors of this type are well known as disclosed for example in Patent Nos. 2,947,857 and 2,963,575. However, because of the arrangement of the present invention, greater flexibility in the positioning of the detector 24 is made possible including its lateral spacing from the ties 26 of the track if found to be desirable.

As shown in FIGURE 3, the heat-conducting device 20 may be mounted on the vertical trailing side 28 of the journal box housing which also includes a top wall 30 and a front wall 32 having an access closure member 34. Normally, radiation picked up by the monitoring detector is emitted from the vertical side 28 of the journal box. Also, when overheating conditions occur, maximum radiation is normally emitted from a location on the vertical side 28 approximately where the heat-conducting device 20 is mounted.

Referring now to FIGURE 4 in particular, it will be observed that the journal box housing encloses the journal 36 received in bearing engagement with the bearing race member or brass 38 positioned below the top wall 30 of the journal box housing by the wedge 40. In accordance with the present invention, however, the interface 42 of the brass 38 is provided with a hemispherical socket 44 for receiving a heat-conductive ball bearing element 46 associated with the heat-conducting device 20. The vertical side wall 28 of the journal box housing is therefore formed with an internally threaded aperture 48 at the proper location in order to threadedly receive the reduced diameter portion 50 of fitting 52 mounted externally on the vertical side wall in alignment with the interface 42 of the brass 38. The fitting 52 is provided with a reduced diameter bore 54, the inner end of which terminates within the journal box chamber to hold the ball bearing element 46 assembled within socket 44. The outer end of the bore 54 terminates at a conical shoulder 56 connecting the bore 54 to an enlarged internally threaded diameter portion 58 which opens to the external end 60 of the fitting 52.

As more clearly seen in FIGURE 5, a positioning member 62 having a diametrically enlarged intermediate portion 64 is held against the conical shoulder 56 so that one axial end portion 66 thereof projects into the bore 54 in order to coaxially mount therewithin an elongated heat-conductive rod member 68. Accordingly, the positioning member 62 is provided with a bore 70 dimensioned to establish a tight fit about the rod member 68 for holding thereof in proper axial position. The inner end portion of the rod member 68 is provided with an annular groove 72 for mounting the smaller diameter end of a conical coil spring 74, the large diameter end of which engages the ball bearing element 56 and urges it into the socket 44 for intimate contact with the brass 38. The ball bearing element 46, the spring 74 which is made of a heat-conductive material and the elongated rod member 68 thereby establish a heat-conductive path having a relatively low thermal impedance between the brass 38 and an emissive end surface 76 formed on the outer end of the rod member 68 externally of the journal box housing. Thus, the temperature difference between the internal brass 38 and the emissive end surface 76 will be substantially reduced as compared to the temperature differential between the brass 38 and any external surface portion of the vertical wall 28. Further, in view of the relatively reduced mass of the parts which form the heat-conductive path between the brass 38 and the emissive surface 76, any change in temperature within the journal box housing will be rapidly communicated to the emissive surface 76 in order to increase the amount of radiation emitted therefrom and thereby permit the detector 24 to monitor any dangerous transient conditions that may exist within the journal box.

The projecting portion of the rod member 68 and in particular the emissive end surface 76 is enclosed within a radiation-directing tube 78. The tube 78 includes a relatively short axial portion 80 which terminates at an outwardly fared end 82 disposed in abutting relation to the rod positioning member 62 within the fitting 52. The tube 78 is therefore held in assembled relation with the positioning member 62 within the fitting 52 by means of an externally threaded assembly nut 84 threadedly received by the enlarged, internally threaded diameter portion 58. An elongated portion 86 of the radiation directing tube 78 extends from the assembly nut 84 at an angle to the longitudinal axis of the rod member 68 and in a direction perpendicular to the emissive end surface 76. Thus, the emissive end surface and the portion 86 of the radiation directing tube 78 will project the radiation beam 22 as aforementioned downwardly and laterally outwardly of the railroad track for reception by the radiation detector 24 when the railroad car is in a predetermined position as shown in FIGURES 1 and 2 traveling over the track. Because of the angular disposition of the radiation directing tube and its associated emissive end surface 76, greater flexibility in the positioning or mounting of the radiation detector will be possible.

In view of the enclosure of the emissive surface 76 within the radiation directing tube 78, the emissive surface 76 will be isolated from other sources of heat radiation in the vicinity so that the effect of ambient temperature conditions on the amount of radiation emitted will be reduced. Toward this end, the radiation detecting tube 78 is internally coated or blackened with a heat-absorbing material 88. Also, the end of the tube from which radiation emerges, is closed by an end cover 90 having a narrow slit or aperture 92 through which radiation emerges. Therefore, the protective enclosure of the emissive surface 76 within the radiation directing tube will prevent any change in its emissivity because of the deposit of dust or other particles thereon.

From the foregoing description, the construction, and installation of the heat-conducting device of the present invention on railroad journal boxes and the advantages arising therefrom will be apparent. The ability of the radiation detectors to effectively monitor railroad journal boxes is thereby significantly enhanced by reducing or eliminating those variable factors which often prevent the radiation detectors from timely sensing an over-heating condition within a journal box.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a railroad track, a railroad car on said track having a journal box and a detection device mounted alongside of said track, said journal box including a housing having a vertical surface and a bearing member mounted internally of the housing, means for enhancing the detection of an overheated condition of the journal box by the detection device comprising, an elongated heat-conductive member mounted by the housing and projecting from said vertical surface thereof, said heat-conductive member having an emissive end surface external to the housing of the journal box, heat transfer means in contact with the bearing member and the heat-conductive member for establishing a path of low thermal impedance from the bearing member to the emissive end surface, and radiation directing means enclosing said emissive end surface and having an aperture through which radiation from the end surface emerges for reception by the detection device.

2. The combination of claim 1 wherein said heat transfer means comprises, a heat-conductive ball element received in a socket formed in the bearing member and conductive spring means mounted on the heat-conductive member and engaging said ball element for biasing thereof into said socket.

3. The combination of claim 2 wherein said radiation directing means comprises an elongated tube secured to the housing and extending from the vertical surface thereof in a direction perpendicular to said emissive end surface, said tube being internally coated with a heat-absorbing material and said end surface being disposed at an angle to the vertical surface of the housing to project radiation toward the detection device.

4. The combination of claim 1 wherein said radiation directing means comprises an elongated tube secured to the housing and extending from the vertical surface thereof in a direction perpendicular to said emissive end surface, said tube being internally coated with a heat-absorbing material and said end surface being disposed at an angle to the vertical surface of the housing to project radiation toward the detection device.

No references cited.

ARTHUR L. LA POINT, *Primary Examiner.*

S. T. KRAWCZEWICZ, *Assistant Examiner.*